United States Patent [19]

Yang

[11] Patent Number: 5,270,490
[45] Date of Patent: Dec. 14, 1993

[54] FLOOR WAX PARTITION PANEL

[76] Inventor: Chin-Hui Yang, 4F., No. 2, Lane 409, Chung Cheng Rd., Hsin Tien City, Taipei Hsien, Taiwan

[21] Appl. No.: 786,213

[22] Filed: Oct. 31, 1991

[51] Int. Cl.⁵ .............................................. H02G 3/28
[52] U.S. Cl. ................................................... 174/48
[58] Field of Search ............... 174/48, 49; 52/220.1, 52/220.3

[56] References Cited

U.S. PATENT DOCUMENTS 2,930,504  3/1960  Hudson ................... 174/48

5,101,078  3/1992  Yang ...................... 174/48

Primary Examiner—Leo P. Picard
Assistant Examiner—David A. Tone
Attorney, Agent, or Firm—Varndell Legal Group

[57] ABSTRACT

A floor box partition panel made from a square plate and fastened in a square floor box for electric wiring, said floor box partition panel having a square hole at the center for fastening a plug switch, and projecting strips symmetrically projecting from the peripheral edge thereof in two opposite directions so that two separate spaces are defined inside said floor box for inserting high tension cables and low tension cables separately.

1 Claim, 3 Drawing Sheets

FLOOR WAX PARTITION PANEL

BACKGROUND OF THE INVENTION

The present invention relates to floor boxes for electric wiring and relates more particularly to a floor box partition panel for separating a floor box into two separate spaces so that high tension cables can be separated from low tension cables.

For electric wiring under the floor, a floor box is generally used. According to conventional methods, high tension cables as well as low tension cables may be inserted through a common floor box. When high and low tension cables are simultaneously inserted through a common floor box, low tension cables may be interfered by high tension cables causing transmission error. Further, inserting high and low tension cables through a common floor box may cause the cables to be in a tangle, and therefore, it becomes difficult to identify the cables for electric wiring or repair.

SUMMARY OF THE INVENTION

The present invention has been accomplished to eliminate the aforesaid problems. It is therefore an object of the present invention to provide a partition panel for a floor box which can separate high tension cables from low tension cables. It is another object of the present invention to provide a partition panel for a floor box which makes indoor electric wiring or repair easy. It is still another object of the present invention to provide a partition panel for a floor box which eliminates electric interference problem.

To achieve the above objects, there is provided a partition panel made from a square plate and fastened in a square floor box for electric wiring, which has a square hole at the center for fastening a plug switch, and a plurality of projecting strips symmetrically projecting from the peripheral edge thereof in two opposite directions. Once the partition panel is placed inside a floor box, it immediately separates the internal space of the floor box into two separate chambers for inserting high tension cables and low tension cables separately.

DETAILED DESCRIPTION OF THE PREFERRED EMBODIMENT

Figure 1:
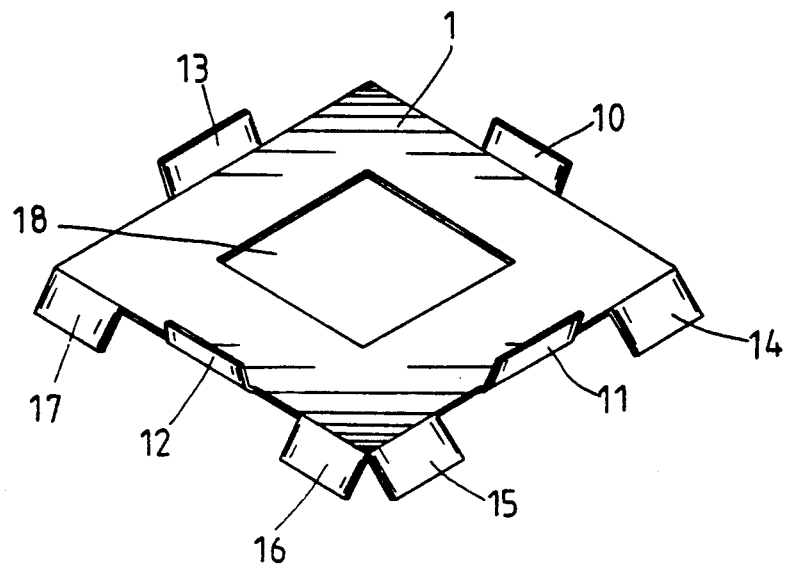
FIG. 1 is a perspective view of a partition panel for a floor box embodying the present invention.

Referring to FIG. 1, a partition panel 1 is made from a square plate having a square hole 18 at the center for fastening a plug switch, four projecting strips 10, 11, 12, 13 respectively obliquely extending upward from the middle of each of the four side edges thereof, and four pairs of end projections 14, 15, 16, 17 . . . respectively obliquely extending downward from the two opposite ends of each of the four side edges thereof.

Figure 2:
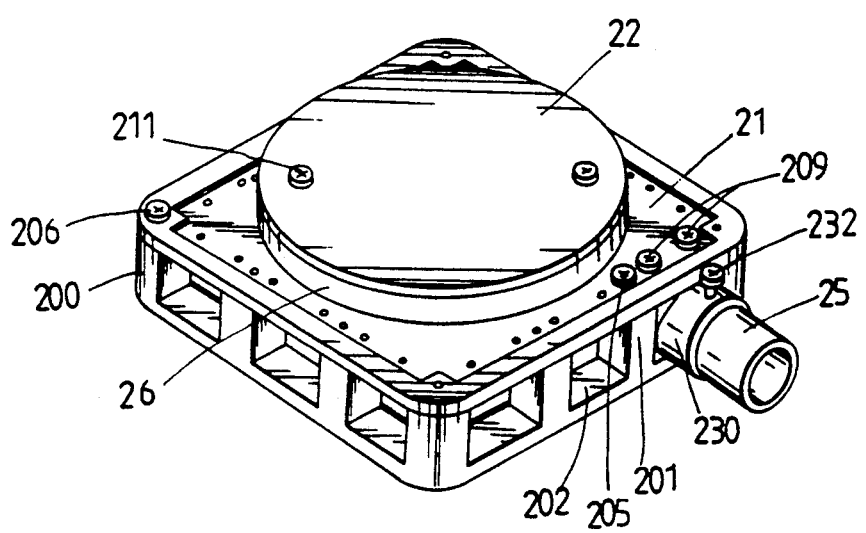
FIG. 2 illustrates a floor box as constructed according to the present invention.
Figure 3:
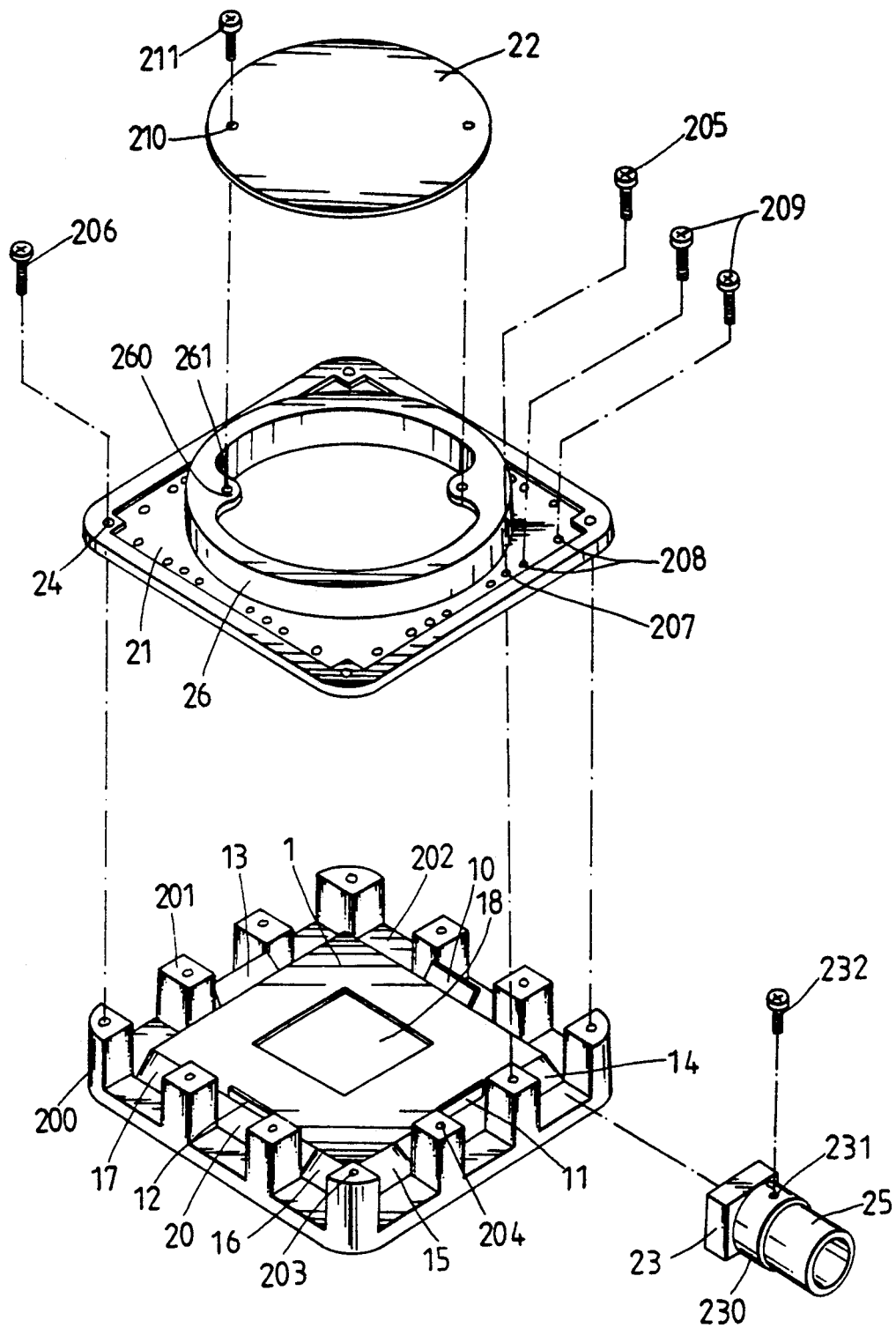
FIG. 3 is an exploded perspective view of the floor box of FIG. 2.

Referring to FIGS. 2 and 3, a floor box 2 is made in a square structure and generally comprised of a base plate 20, a top plate 21, a cover 22, and a plurality of connectors 23. The base plate 20 has four sector posts 200 at the four corners thereof, a plurality of pairs of square posts 201 symmetrically around the peripheral edge thereof. The sector and square posts 200, 201 define therein a plurality of equal gaps 202. Further, the sector and square posts 200, 201 each has a bolt hole 203 or 204 on the top edge thereof. The top plate has round holes 24, 207 around the peripheral edge thereof corresponding to the belt holes 203, 204 on the sector and square posts 200, 201. By screwing screws 205, 206 through the round holes 24, 207 into the bolt holes 203, 204, the top plate is fixedly secured to the base plate 20. The top plate further comprises a plurality of pairs of bolt holes 208 around the peripheral edge thereof corresponding to the gaps 202 on the base plate 20, and a ring-shaped flange 26 at the center. By screwing screws into the bolt holes 208, a plurality of connectors 23 can be respectively secured in the gaps 202. The ring-shaped flange 26 which defines therein an opening has two inward lugs 260 transversely disposed at two opposite locations, which inward lugs 260 each has a bolt hole 261 for fastening the cover 22. The cover has two round holes 210 at two opposite locations corresponding to the bolt holes 261 on the two inward lugs 260 of the ring-shaped flange 26 of the top plate 21. By screwing screws 211 through the round holes 210 into the bolt holes 261, the cover 22 is firmly secured to the top plate 21 to seal the opening in the ring-shaped flange 26. Each connector 23 comprises a bolt hole 231 on the outer wall 230 thereof. By screwing a screw 232 into the bolt hole 231, a wire conduit 25 is firmly secured to each connector 23 for wiring. During assembly process, the partition panel 1 is placed inside the base plate 20 before the fastening of the top plate 21.

Figure 4:
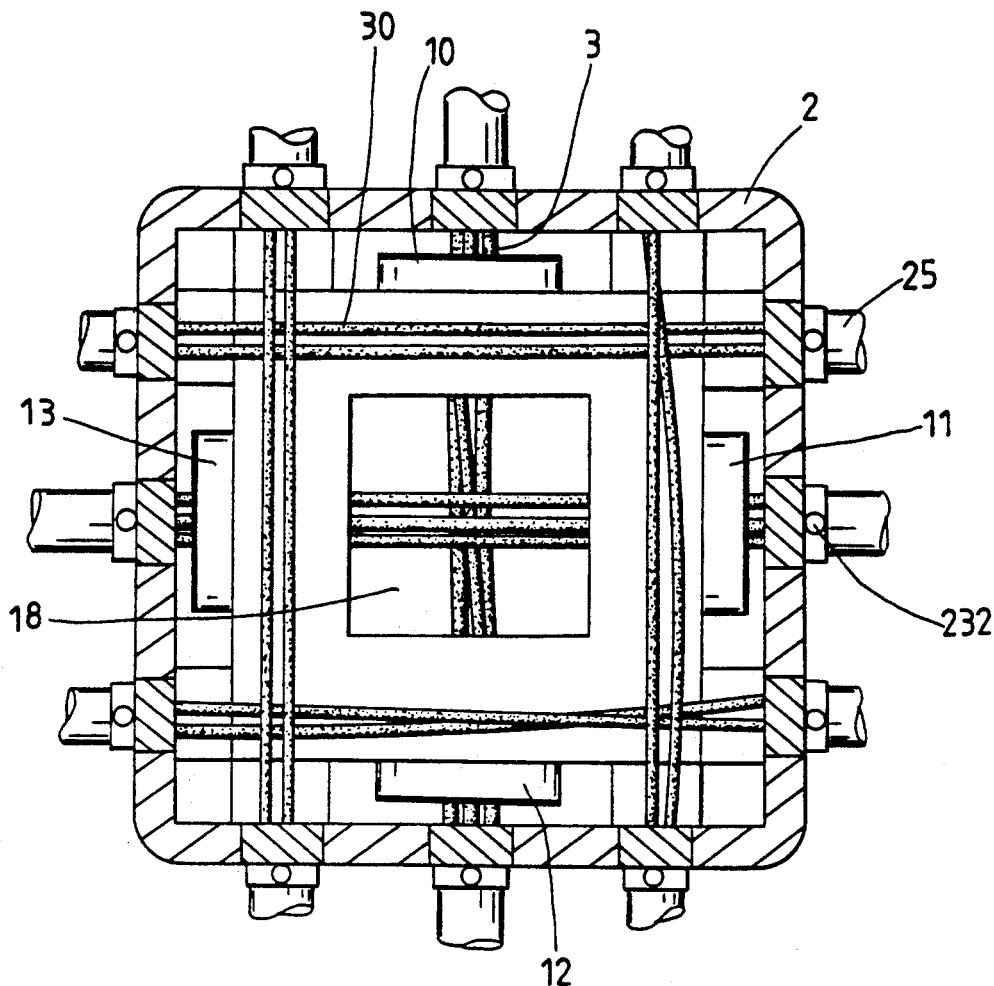
FIG. 4 is a sectional top view showing that low tension cables are separated from high tension cables by the partition panel.
Figure 5:
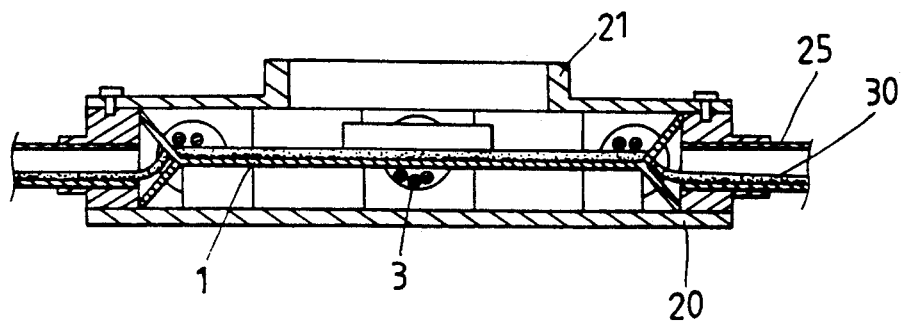
FIG. 5 is a side sectional view of FIG. 4.

Referring to FIGS. 4 and 5, because of the arrangement of the projecting strips 10, 11, 12, 13, and the end projections 14, 15, 16, 17, . . . , the partition panel 1 is spaced from the base plate 20 and the top plate 21, and therefore, high tension cables 3 and low tension cables 30 can be inserted through the floor box 2 and separated by the partition panel 1 without causing any interference. Therefore, the present invention makes electric wiring easy and eliminates electric interference problem.

I claim:

1. A partitioned floor box for electrical wiring comprising a square floor box and floor box partition panel fastened in said square floor box, said floor box partition panel including a square plate with a centrally arranged square hole and four sides, said four sides each having a middle with a projecting strip obliquely extending in one direction and two opposing ends respectively with a projecting strip obliquely extending in an opposite direction, said projecting strips spacing said floor box partition panel from top and bottom edges of said square floor box and separating high tension cables and low tension cables contained in said square floor box.

* * * * *